(12) United States Patent
Matosevich et al.

(10) Patent No.: US 11,550,734 B1
(45) Date of Patent: Jan. 10, 2023

(54) GENERATION OF HOST CONNECTIVITY PLANS WITH LOAD BALANCING AND RESILIENCY

(71) Applicant: Dell Products L.P., Round Rock, TX (US)

(72) Inventors: Rivka Mayraz Matosevich, Zichron Ya'acov (IL); Gil Ben Zeev, Haifa (IL); Ziv Dor, Rishon Letzion (IL); Yuval Peleg Lieblich, Haifa (IL); Roi Tagar, Haifa (IL); Amir Aloosh, Netanya (IL); Eyal Brami, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/482,935

(22) Filed: Sep. 23, 2021

(51) Int. Cl.
*G06F 13/10* (2006.01)
*G06F 9/50* (2006.01)

(52) U.S. Cl.
CPC .......... *G06F 13/102* (2013.01); *G06F 9/5083* (2013.01)

(58) Field of Classification Search
None
See application file for complete search history.

(56) References Cited

U.S. PATENT DOCUMENTS

| 10,992,532 | B1* | 4/2021 | Smith | H04L 67/1008 |
| 2003/0163592 | A1* | 8/2003 | Odenwald | G06F 3/0601 709/250 |

OTHER PUBLICATIONS https://brasstacksblog.typepad.com/brass-tacks/2012/01/introducing-target-driven-zoning-tdz.html, downloaded on Sep. 14, 2021.
https://community.hpe.com/t5/Around-the-Storage-Block/NimbleOS-5-2-Simplify-Fibre-Channel-Deployments-with-Target/ba-p/7090929#.YTJ-f45Kick, downloaded on Sep. 14, 2021.
https://fibrechannel.org/fibre-channel-san-automation-and-orchestration/, downloaded on Sep. 14, 2021.

* cited by examiner

*Primary Examiner* — Scott C Sun
(74) *Attorney, Agent, or Firm* — Ryan, Mason & Lewis, LLP

(57) ABSTRACT

Techniques are provided for generating host connectivity plans with load balancing and resiliency. One method comprises obtaining a number of storage system target ports needed for a given host; identifying available target ports in the storage system and an input-output (IO) target component associated with each available target port; and calculating the host connectivity plan until the host connectivity plan includes the obtained number of target ports by: (i) selecting at least one IO target component not already in the host connectivity plan that satisfies a resiliency policy and/or a load balancing policy; (ii) selecting at least one target port associated with the selected at least one IO target component and (iii) adding the selected at least one target port to the host connectivity plan. The resiliency policy may require connectivity without a single point of failure. The load balancing policy may specify that the IO target components serve a substantially equal IO load.

20 Claims, 7 Drawing Sheets

400 — RESILIENCY POLICY:
HOST CONNECTIVITY PLAN MUST INCLUDE AT LEAST TWO TARGET PORTS THAT PROVIDE CONNECTIVITY WITHOUT A SINGLE POINT OF FAILURE

500 — LOAD BALANCING POLICY:
EACH IO TARGET COMPONENT SERVES APPROXIMATELY THE SAME IO LOAD

GENERATION OF HOST CONNECTIVITY PLANS WITH LOAD BALANCING AND RESILIENCY

FIELD

The field relates generally to information processing systems, and more particularly to storage in such systems.

BACKGROUND

A number of factors are often considered when connecting a particular host to a storage system, such as the input-output (IO) load generated by the particular host and other hosts, and the desired resiliency to failure. The generation of host connectivity plans (sometimes referred to as host-to-storage connectivity plans) can be challenging, for example, when there is a large number of components, such as hosts, storage system ports, and storage volumes. The task is further complicated when (i) the IO load generated by a number of different hosts is unequal, (ii) the IO load of one or more hosts changes and/or (iii) the configuration of the host, the storage system and/or the network (or portions thereof) changes dynamically (e.g., following a failure).

A need exists for improved techniques for generating host connectivity plans.

SUMMARY

In one embodiment, a method comprises obtaining a number of target ports of a storage system needed in a host connectivity plan for a given host device; identifying a plurality of available target ports in the storage system and an IO target component, of a plurality of IO target components, associated with each available target port; calculating the host connectivity plan by performing the following steps until the host connectivity plan includes the obtained number of target ports: (i) selecting at least one of the plurality of IO target components that is not already in the host connectivity plan that satisfies one or more of a resiliency policy and a load balancing policy; (ii) selecting at least one of one or more target ports associated with the selected at least one IO target component; and (iii) adding the selected at least one target port to the host connectivity plan; and providing the host connectivity plan to the given host device.

In some embodiments, the resiliency policy specifies that the host connectivity plan must include at least two target ports that provide connectivity without a single point of failure. The host connectivity plan may allow the host device to connect to the storage system using at least two different paths such that a failure of any one hardware component in the at least two different paths will not impact both of the at least two different paths.

In one or more embodiments, the load balancing policy specifies that the plurality of IO target components serves a substantially equal IO load. For example, the load balancing policy may balance an IO load among the plurality of IO target components based on: a number of host connections, a number of storage volumes, an expected IO load and/or an average IO load.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating host connectivity plans with load balancing and/or resiliency.

As noted above, a number of factors are often considered when connecting a host to a storage system. For example, a host connectivity plan should connect a given host to all of the storage volumes that the given host should access. While some storage systems provide equal access to all of the storage volumes from any connection, other storage systems provide optimized access through some connections and non-optimized access through other connections. In addition, there are storage systems that provide access to some storage volumes through a first set of connections and access to other storage volumes through a second set of connections. In general, the access provided by a given storage system depends on the system architecture. The implementation of a number of host devices may limit the number of paths per storage volume, so that performance issues are not experienced when the number of paths is high. In addition, a host connectivity plan may need to minimize a total number of connections between a host device and the storage system (e.g., while still achieving the load balancing and resiliency goals).

It is often desired that a host connectivity plan should provide a desired level of resiliency from failures. For example, a resiliency policy may specify that a host connectivity plan for a given host must include at least two target ports of a storage system that provide connectivity without a single point of failure (e.g., failure of a host port, a switch, or a storage system port). A resiliency policy may also specify a higher level of resiliency, such as the ability to survive multiple failures (e.g., the ability to survive the failure of both a host port and a switch).

A host connectivity plan may also (or alternatively) have to satisfy a load balancing policy. For example, the load balancing policy may balance the workload of the hosts that connect to the storage system over the resources of the storage system to achieve a good utilization of the resources. An unbalanced workload can lead, for example, to a bottleneck in one portion of a storage system while other portions have available resources.

Figure 1:
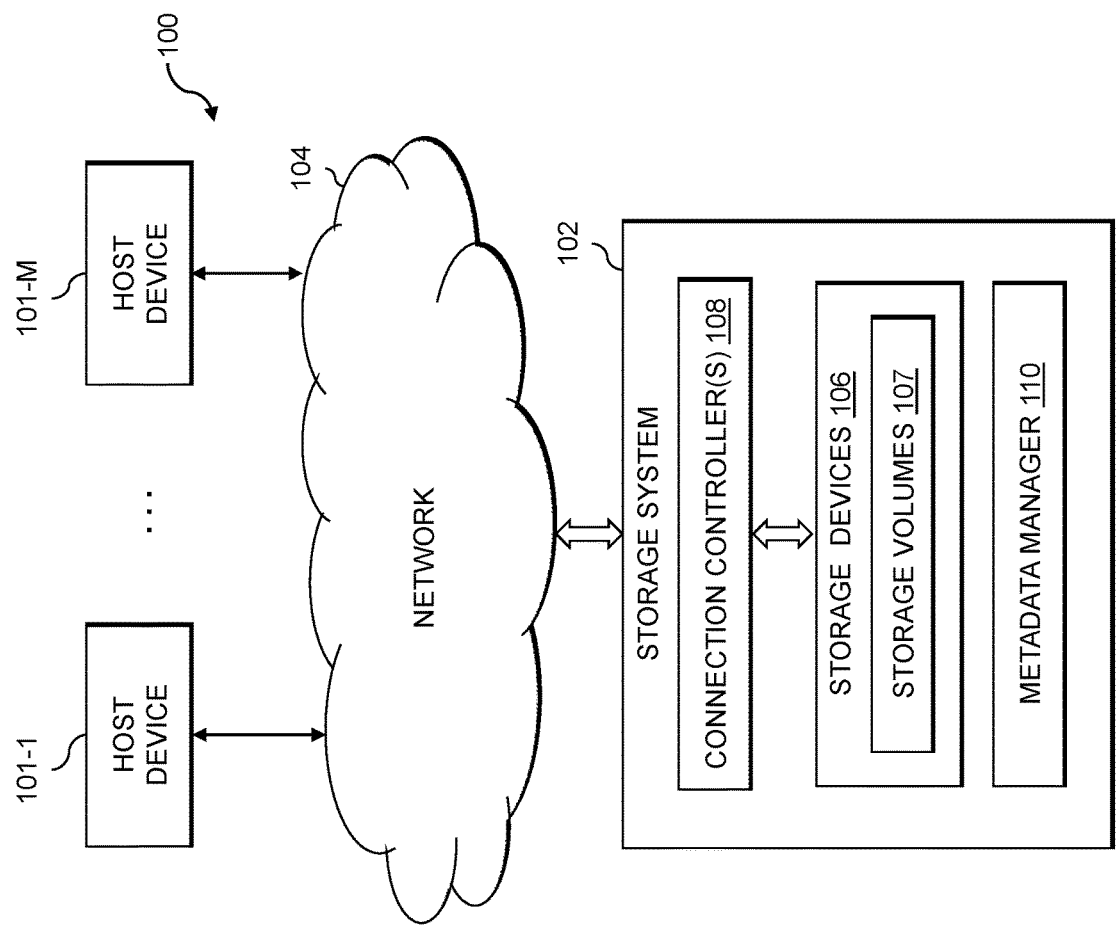
FIG. 1 illustrates an information processing system configured for generating host connectivity plans with load balancing and resiliency in accordance with an illustrative embodiment.

FIG. 1 shows an information processing system 100 configured in accordance with an illustrative embodiment. The information processing system 100 comprises a plurality of host devices 101-1 through 101-M, collectively referred to herein as host devices 101 (e.g., host servers). The host devices 101 are configured to communicate with a storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate IO operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of a cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106, one or more connection controllers 108 and a metadata manager 110. In at least some embodiments, each connection controller 108 is unique to a host device 101 and describes a unique connection of the host device 101 to the storage system 102. The metadata manager 110 may be implemented, for example, as a software object that manages the storage system 102. The metadata manager 110 may implement at least some of the disclosed functionality to generate host connectivity plans with load balancing and/or resiliency, as discussed further below in conjunction with, for example, FIG. 3.

The storage devices 106 store data of a plurality of storage volumes 107. For example, the storage volumes 107 may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device (e.g., a LUN) which can span multiple physical volumes. The term "storage volume" as used herein is intended to be broadly construed, and shall encompass, for example, a virtual disk, other units of data storage, a logical storage volume, and a namespace, and should not be viewed as being limited to any particular format or configuration.

The storage devices 106 of the storage system 102 illustratively comprise solid state drives (SSDs). Such SSDs are implemented using NVM devices such as flash memory. Other types of NVM devices that can be used to implement at least a portion of the storage devices include non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in the storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives, storage appliances or other types of storage devices.

In some embodiments, the storage system 102 illustratively comprises a scale-out all-flash distributed content addressable storage (CAS) system, such as a storage array. A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The MPIO driver may comprise, for example, an otherwise conventional MPIO driver. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

In some embodiments, the storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller of the storage system 102. For example, in some embodiments the sets of processing modules of the storage nodes collectively comprise a distributed storage controller of the storage system 102. A "distributed storage system" as that term is broadly used herein is intended to encompass any storage system that is distributed across multiple storage nodes.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers.

Additional examples of processing platforms utilized to implement host devices 101 and storage system 102 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, storage system 102, and network 104 can be used in other embodiments.

It should be understood that the particular sets of components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
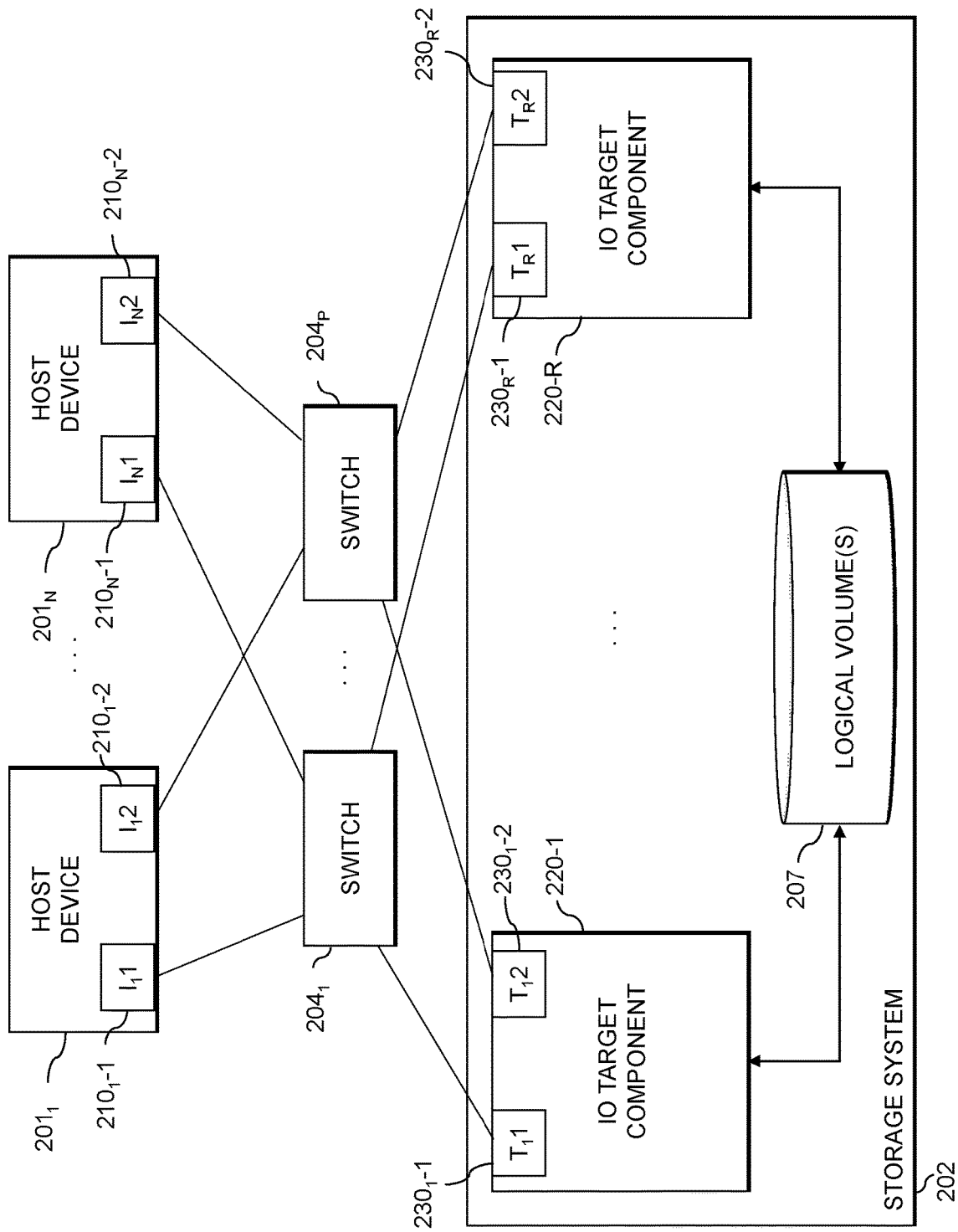
FIG. 2 is a block diagram illustrating switches that connect between host servers and components of the storage system of FIG. 1 in one or more illustrative embodiments.

FIG. 2 is a block diagram illustrating switches $204_1$ through $204_P$ that connect between host devices $201_1$ through $201_N$ and IO target components 220-1 through 220-R (e.g., storage data targets) of a storage system 202 in one or more illustrative embodiments.

Each of the host devices 201 illustratively has one or more IO paths to the storage system 202 using one or more of the switches $204_1$ through $204_P$, with at least one of the storage devices 106 of the storage system 202 being visible to that host device 201 on a given one of the paths. A given one of the storage devices 106 (e.g., logical volumes 207) may be accessible to the given host device 201 over one or more IO paths.

In illustrative embodiments, with reference to the example of FIG. 2, each of the host devices $201_1$ through $201_N$ comprises one or more initiator ports 210, e.g., initiator ports $210_1$-1, $210_1$-2, $210_N$-1 and $210_N$-2, which are utilized to communicate with the storage system 202 via one or more switches $204_1$ through $204_P$. In some embodiments, the initiator ports 210 are referred to as initiators for the 10 paths. For example, the initiator port $210_1$-1 of host device $201_1$ may be referred to as initiator 1 ($I_1 1$) and the initiator port $210_1$-2 of host device $201_1$ may be referred to as initiator 2 ($I_1 2$). Initiator ports 210 may comprise any circuitry that is configured to enable communication between the host devices 201 and the storage system 202 or any other devices.

In addition, with continued reference to the example of FIG. 2, each of the IO target components 220-1 through 220-R provides IO target functionality and comprises one or more target ports 230, e.g., target ports $230_1$-1, $230_1$-2, $230_R$-1 and $230_R$-2, which are utilized to communicate with one or more host devices 201 via the one or more switches $204_1$ through $204_P$. In some embodiments, the target ports 230 are referred to as targets for the 10 paths. For example, the target port $230_1$-1 of IO target component 220-1 may be referred to as target 1 ($T_1 1$) and the target port $230_1$-2 of IO target component 220-1 may be referred to as target 2 ($T_1 2$). Target ports 230 may comprise any circuitry that is configured to enable communication between the host devices 201 and the storage system 202 or any other devices.

In the example of FIG. 2, each IO target component 220 is associated with (e.g., serves) one or more target ports 230 and therefore the selection of a target port 230 also selects the 10 target component 220 associated with the selected target port 230.

As noted above, in some embodiments, a resiliency policy may specify that the generated host connectivity plan must include at least two target ports 230 that provide connectivity without a single point of failure along a given path (e.g., a path between an initiator port 210 and an IO target component 220). The term "path," as used herein, comprises a connection between an initiator port 210 and a target port 230, through which a given host device 201 can access a specific storage volume (or LUN).

Figure 3:
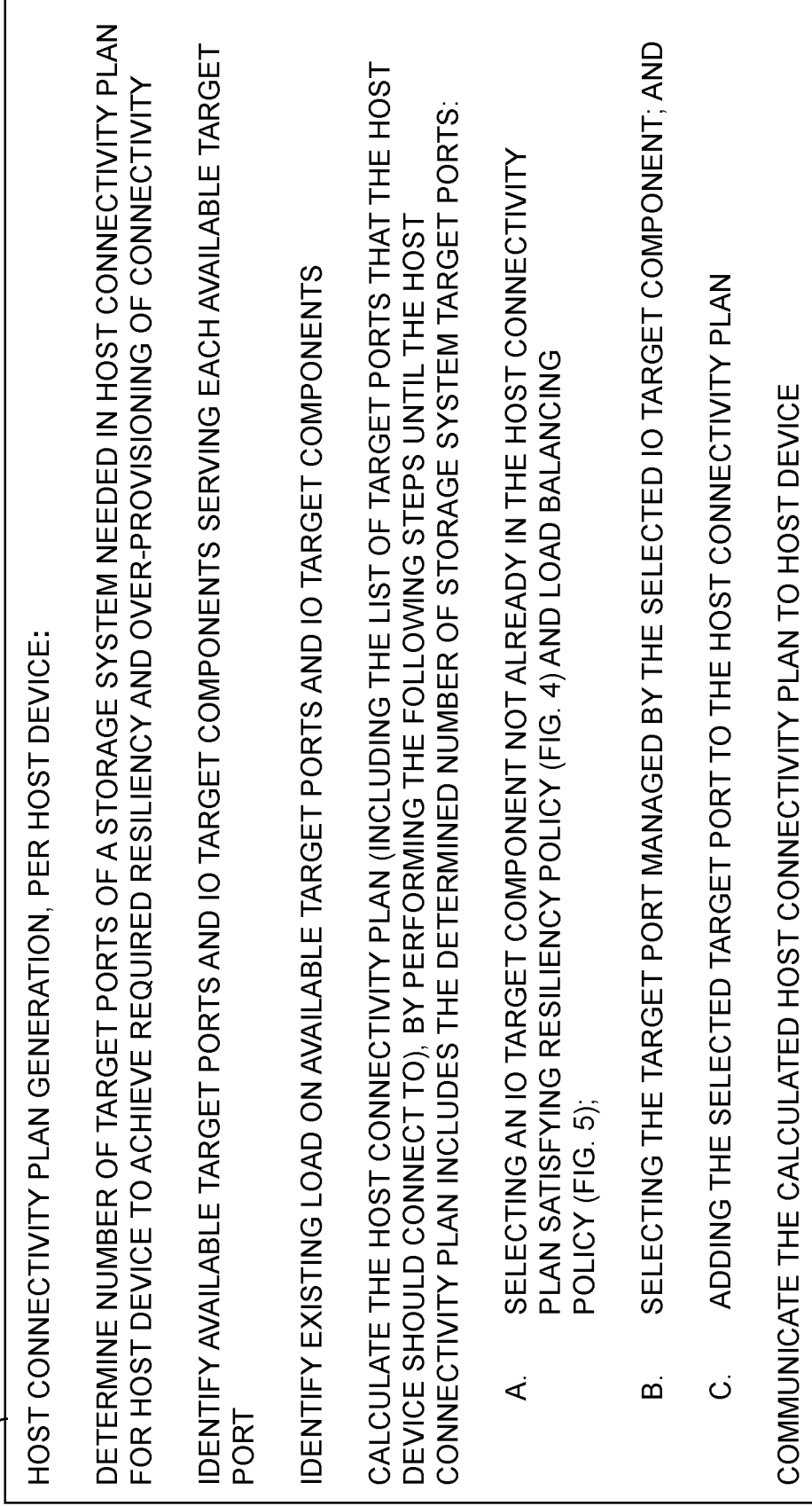
FIG. 3 illustrates exemplary pseudo code for a process for generating a host connectivity plan, according to one embodiment of the disclosure.

FIG. 3 illustrates exemplary pseudo code 300 for a process for generating a host connectivity plan, according to one embodiment of the disclosure. In the example of FIG. 3, the pseudo code 300 generates a host connectivity plan generation, per host device 201. The exemplary pseudo code 300 initially determines a number of target ports of a storage system needed in the host connectivity plan in order for the host device 201 to achieve the required resiliency and an over-provisioning of connectivity. The number of target ports needed in the host connectivity plan may be, for example, a constant value, a value configured by a user and a value calculated using an expected load of the host device.

The available target ports and the IO target components serving each available target port are identified, and then the existing load on the available target ports and on IO target components (e.g., from hosts already connected to the storage system 202) is identified. The load may be estimated, for example, based on a number of connections, a historical maximum load, a historical average load and/or a number of exposed volumes.

Figure 4:
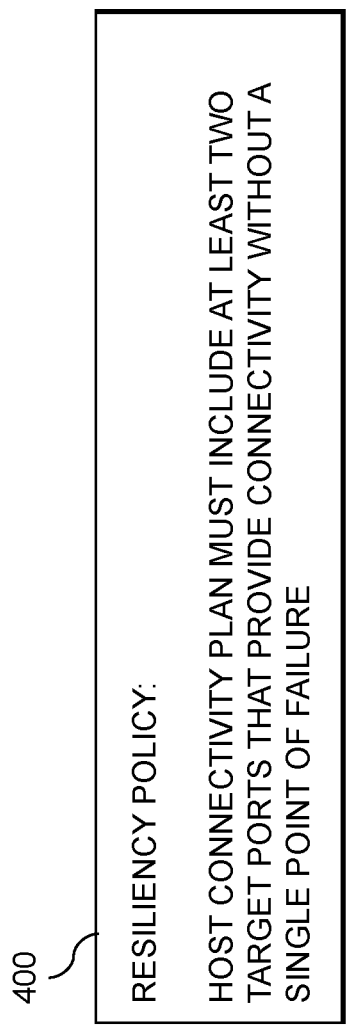
FIG. 4 illustrates an exemplary resiliency policy that can be used in the generation of host connectivity plans in accordance with some illustrative embodiments.
Figure 5:
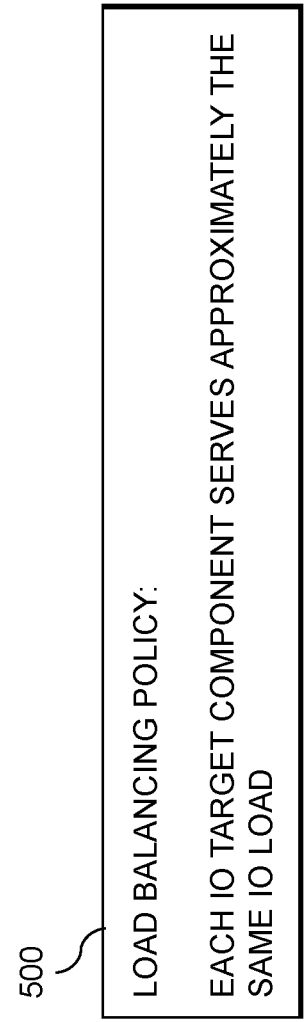
FIG. 5 illustrates an exemplary load balancing policy that can be used in the generation of host connectivity plans according to one or more embodiments.

In the example of FIG. 3, the pseudo code 300 then calculates the host connectivity plan (including a list of the target ports that the host device 201 should connect to) by performing the following steps until the host connectivity plan includes the determined number of storage system target ports: selecting an IO target component that is not already in the host connectivity plan and that satisfies a resiliency policy (e.g., the exemplary resiliency policy discussed further below in conjunction with FIG. 4) and a load balancing policy (e.g., the exemplary load balancing policy discussed further below in conjunction with FIG. 5); selecting the target port managed by the selected IO target component; and adding the selected target port to the host connectivity plan. The calculated host connectivity plan is then communicated to the host device 201.

As noted above, at least portions of the pseudo code 300 may be implemented by the metadata manager 110 of FIG. 1. In at least some embodiments, the generated host connectivity plan provides the path resiliency specified by the resiliency policy of FIG. 4, and the sum of the host connectivity plans for the host devices $201_1$ through $201_N$ balances the IO load of the host devices $201_1$ through $201_N$ across the resources of the storage system 202.

In at least some embodiments, as long as the number of IO target components 220 is greater than the number of target ports 230 that the host connectivity plan should include, then the pseudo code 300 finds a solution that satisfies the conditions in the policies. For example, the generated host connectivity plan will include target ports 230 from at least two IO target components 220, and when the host device 201 connects to the provided target ports 230, the number of host devices 201 connected to each IO target component 220 will be approximately similar.

As noted above, the calculated host connectivity plan is then communicated to the host device 201. For example, the calculated host connectivity plan can be communicated to the host device 201 using an in-band protocol, manually or by another method. The in-band protocol may comprise, for example:

1. iSCSI (Small Computer Systems Interface) Discovery: the storage system 202 may respond to an iSCSI discovery command from a host device 201 (e.g., by issuing a discovery command, such as a SendTargets command) by returning the target ports 230 in the host connectivity plan for the host device 201; or
2. NVMe-oF (NVM Express over Fabrics) Discovery: the storage system 202 may respond to the discovery by a host device 201 (e.g., Get Log Page requesting the Discovery log page) with a list of target ports 230 in the host connectivity plan for the host device 201.

While the embodiment of FIG. 3 selects one IO target component and one associated target port for each iteration, in other embodiments more than one IO target component and/or associated target port can be selected for each iteration, as would be apparent to a person of ordinary skill in the art.

FIG. 4 illustrates an exemplary resiliency policy 400 that can be used in the generation of host connectivity plans in accordance with some illustrative embodiments. In the example of FIG. 4, the resiliency policy 400 specifies that the host connectivity plan must include at least two target ports 230 that provide connectivity between the host device 201 and the storage system 202 without a single point of failure. For example, the resiliency policy 400 may require that the generated host connectivity plan allows the host device 201 to connect to the storage system 202 using at least two different paths such that a failure of any one hardware component in the at least two different paths will not impact both of the at least two different paths. In one exemplary implementation, the connectivity plan may include ports that belong to two separate hardware failure domains on the storage system and that are connected to two different switches.

While the exemplary resiliency policy of FIG. 4 prevents a single point of failure between the host device 201 and the storage system 202, other resiliency policies may allow multiple failures, as would be apparent to a person of ordinary skill in the art.

Among other benefits, the exemplary resiliency policy 400 spreads the target ports 230 in a host connectivity plan over virtual LANs, switches or subnetworks, allowing path resiliency over network components. In the example of FIG. 2, a user can ensure that the resulting paths will have resiliency for any one failure between the initiator ports 210 of a host device 201 and the IO target component 220 (e.g., in the storage system or outside of the storage system). Thus, a failure of an initiator port 210, a switch 204, or a target port 230 in a given path only affects some of the available paths (one in FIG. 2) while leaving other paths unaffected.

FIG. 5 illustrates an exemplary load balancing policy 500 that can be used in the generation of host connectivity plans according to one or more embodiments. In the example of FIG. 5, the load balancing policy 500 each IO target component 220 serves approximately the same IO load. For example, the IO load may be approximated using one or more of a number of connections, a number of storage volumes, an expected IO load and an average IO load. The expected IO load may be obtained, for example, by applying artificial intelligence techniques over historical IOs.

In one or more embodiments, the load balancing policy 500 may be implemented by selecting an IO target component 220 having the least number of connected hosts. The load balancing policy may balance an IO load among the IO target components 220-1 through 220-R based on an approximation of the IO load, such as the number of host connections, the number of storage volumes, the expected IO load and/or the average IO load.

The balancing of the IO load may comprise determining an IO load on each of the IO target components 220-1 through 220-R (e.g., for the given host device 201 for which a host connectivity plan is being generated and for one or more additional host devices 201 connected to each of the IO target components 220-1 through 220-R).

If the balancing of the IO load is based on the number of host connections, for example, a number of variations may be considered. For example, all storage volumes may be accessible through every connection, meaning that the number of paths is substantially equal to the number of connections multiplied by the number of storage volumes. In another variation, each storage volume may be exposed through some connections, meaning that the number of paths is less than the number of connections multiplied by the number of storage volumes. The selection of the target ports 230 can be made based on the number of host connections and the storage volumes of the hosts are spread over the already selected target ports. Alternatively, the selection of the target ports 230 can be made based on the number of storage volumes exposed through each IO target component 220 associated with the respective target port 230.

Figure 6:
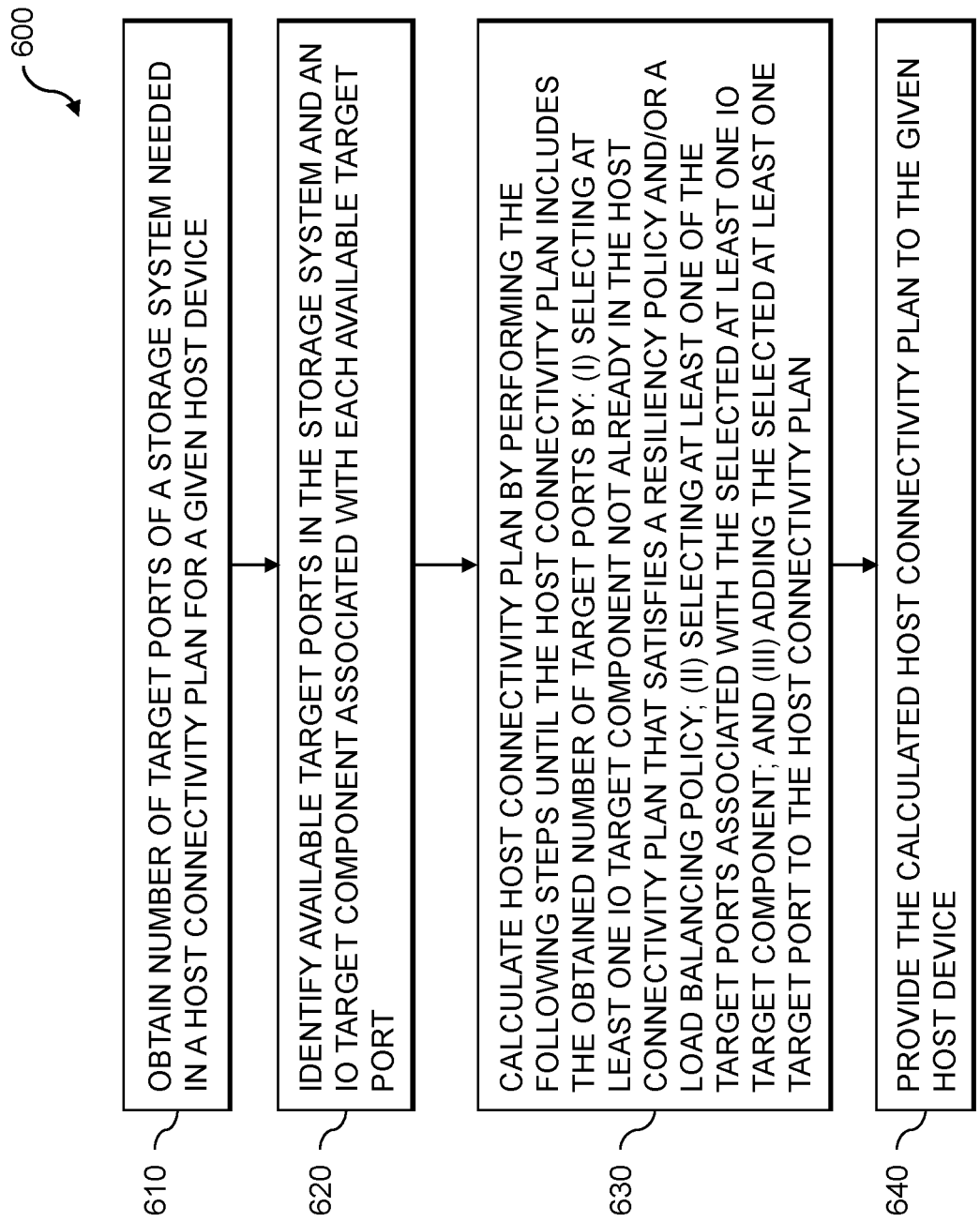
FIG. 6 is a flow diagram illustrating an exemplary implementation of a process for generating host connectivity plans with load balancing and resiliency, according to at least some embodiments.

FIG. 6 is a flow diagram illustrating an exemplary implementation of a process 600 for generating host connectivity plans with load balancing and resiliency, according to at least some embodiments. In the example of FIG. 6, the exemplary process 600 initially obtains a number of target ports of a storage system needed in a host connectivity plan for a given host device in step 610.

In step 620, the process 600 identifies available target ports in the storage system and an IO target component associated with each available target port. The process 600 then calculates the host connectivity plan in step 630 by performing the following steps until the host connectivity plan includes the obtained number of target ports: (i) selecting at least one IO target component that is not already in the host connectivity plan that satisfies a resiliency policy and/or a load balancing policy; (ii) selecting at least one of one or more target ports associated with the selected at least one IO target component and (iii) adding the selected at least one target port to the host connectivity plan.

The calculated host connectivity plan is provided to the given host device in step 640 (for example, using an in-band protocol described above).

In some embodiments, the resiliency policy specifies that the host connectivity plan must include at least two target ports that provide connectivity without a single point of failure. The host connectivity plan may allow the host device to connect to the storage system using at least two different paths such that a failure of any one hardware component in the at least two different paths will not impact both of the at least two different paths.

In one or more embodiments, the load balancing policy specifies that the plurality of IO target components serves a substantially equal IO load. For example, the load balancing policy may balance an IO load among the plurality of IO target components based on: a number of host connections, a number of storage volumes, an expected IO load and/or an average IO load.

The particular processing operations and other network functionality described in conjunction with the pseudo code of FIG. 3 and the flow diagram of FIG. 6 are presented by way of illustrative example only, and should not be construed as limiting the scope of the disclosure in any way. Alternative embodiments can use other types of processing operations to generate host connectivity plans with load balancing and resiliency. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

In some embodiments, the disclosed techniques for generating host connectivity plans provide a mechanism for generating host connectivity plans that automatically manage and satisfy one or more resiliency policies 400 and/or one or more load balancing policies 500.

One or more embodiments of the disclosure provide improved methods, apparatus and computer program products for generating host connectivity plans with load balancing and resiliency. The foregoing applications and associated embodiments should be considered as illustrative only, and numerous other embodiments can be configured using the techniques disclosed herein, in a wide variety of different applications.

It should also be understood that the disclosed host connectivity plan generation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generating host connectivity plans with load balancing and resiliency may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based host connectivity plan generation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based host connectivity plan generation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
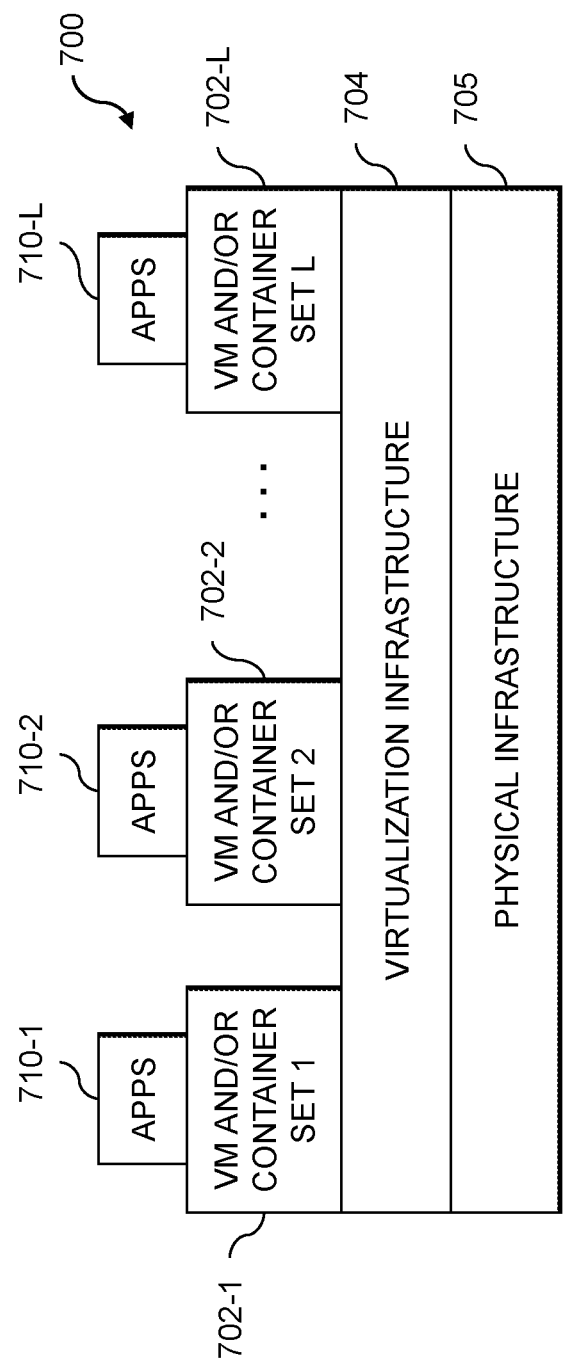
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide host connectivity plan generation functionality of the type described above for one or more processes running on a given one of the VMs. For example, each of the VMs can implement host connectivity plan generation control logic and associated management of load balancing and/or resiliency policies for providing host connectivity plan generation functionality for one or more processes running on that particular VM.

An example of a hypervisor platform that may be used to implement a hypervisor within the virtualization infrastructure 704 is a compute virtualization platform which may have an associated virtual infrastructure management system such as server management software. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide host connectivity plan generation functionality of the type described above for one or more processes running on different ones of the containers. For example, a container host device supporting multiple containers of one or more container sets can implement one or more instances of host connectivity plan generation control logic and associated management of load balancing and/or resiliency policies for providing host connectivity plan generation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
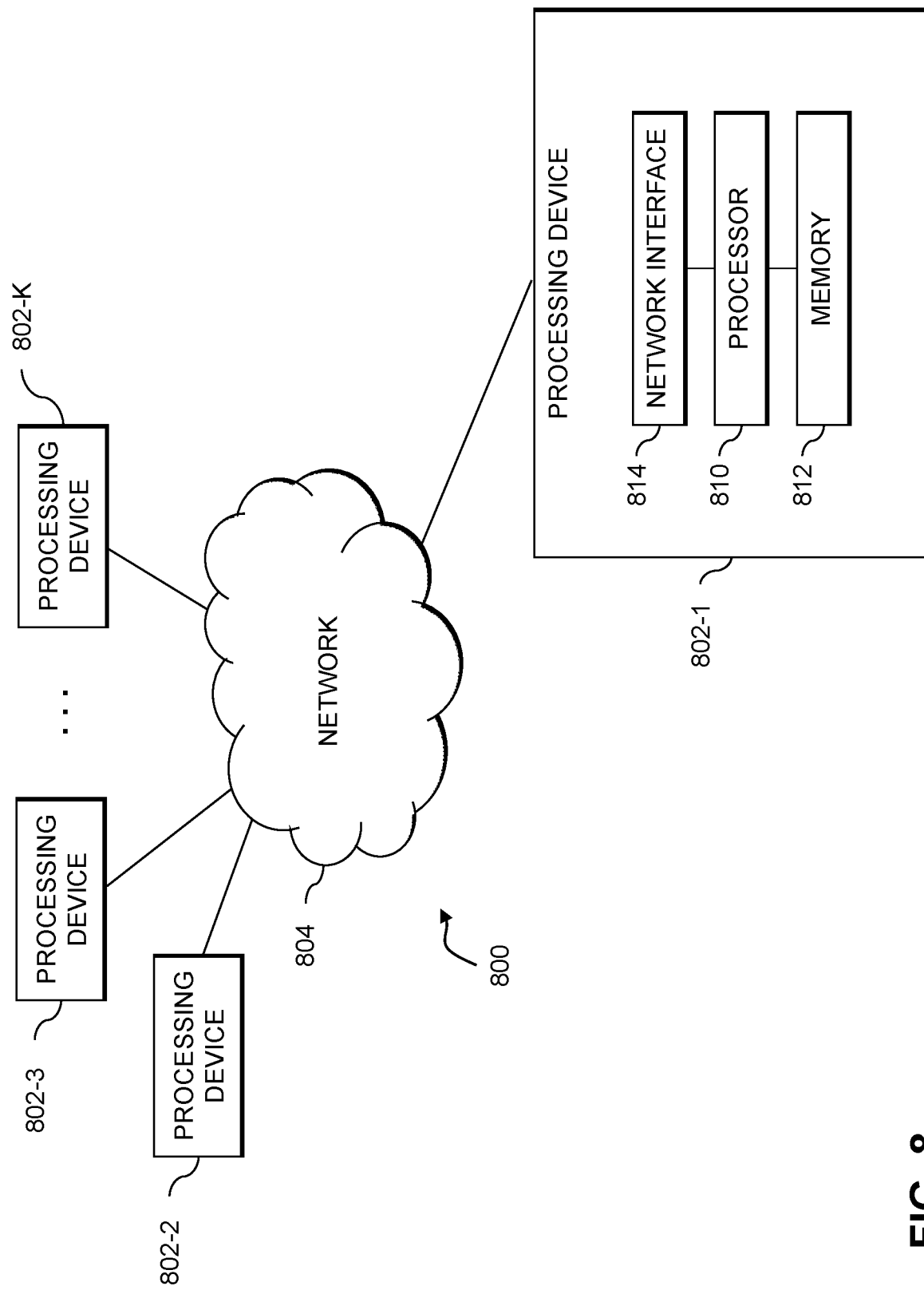
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a number of target ports of a storage system needed in a host connectivity plan for a given host device;
    identifying a plurality of available target ports in the storage system and an input-output (IO) target component, of a plurality of IO target components, associated with each available target port;
    calculating the host connectivity plan by performing the following steps until the host connectivity plan includes the obtained number of target ports: (i) selecting at least one of the plurality of IO target components that is not already in the host connectivity plan that satisfies one or more of a resiliency policy and a load balancing policy; (ii) selecting at least one of one or more target ports associated with the selected at least one IO target component; and (iii) adding the selected at least one target port to the host connectivity plan; and
    providing the host connectivity plan to the given host device;
    wherein the method is performed by at least one processing device comprising a processor coupled to a memory.

2. The method of claim 1, wherein the number of target ports needed in the host connectivity plan comprises one or more of a constant value, a value configured by a user and a value calculated using an expected load of the given host device.

3. The method of claim 1, wherein the host connectivity plan comprises a list of the selected target ports for the given host device to connect with.

4. The method of claim 1, wherein the resiliency policy specifies that the host connectivity plan must include at least two target ports that provide connectivity without a single point of failure.

5. The method of claim 4, wherein the host connectivity plan allows the given host device to connect to the storage system using at least two different paths such that a failure of any one hardware component in the at least two different paths will not impact both of the at least two different paths.

6. The method of claim 1, wherein the load balancing policy balances an IO load among the plurality of IO target components based at least in part on one or more of: a number of host connections, a number of storage volumes, an expected IO load and an average IO load.

7. The method of claim 6, further comprising determining an IO load on each of the plurality of IO target components by identifying one or more additional host devices connected to each of the plurality of IO target components.

8. The method of claim 1, wherein the load balancing policy specifies that the plurality of IO target components serves a substantially equal IO load.

9. An apparatus comprising:
at least one processing device comprising a processor coupled to a memory;
the at least one processing device being configured to implement the following steps:
obtaining a number of target ports of a storage system needed in a host connectivity plan for a given host device;
identifying a plurality of available target ports in the storage system and an input-output (IO) target component, of a plurality of IO target components, associated with each available target port;
calculating the host connectivity plan by performing the following steps until the host connectivity plan includes the obtained number of target ports: (i) selecting at least one of the plurality of IO target components that is not already in the host connectivity plan that satisfies one or more of a resiliency policy and a load balancing policy; (ii) selecting at least one of one or more target ports associated with the selected at least one IO target component; and (iii) adding the selected at least one target port to the host connectivity plan; and
providing the host connectivity plan to the given host device.

10. The apparatus of claim 9, wherein the host connectivity plan comprises a list of the selected target ports for the given host device to connect with.

11. The apparatus of claim 9, wherein the resiliency policy specifies that the host connectivity plan must include at least two target ports that provide connectivity without a single point of failure.

12. The apparatus of claim 11, wherein the host connectivity plan allows the given host device to connect to the storage system using at least two different paths such that a failure of any one hardware component in the at least two different paths will not impact both of the at least two different paths.

13. The apparatus of claim 9, wherein the load balancing policy balances an IO load among the plurality of IO target components based at least in part on one or more of: a number of host connections, a number of storage volumes, an expected IO load and an average IO load.

14. The apparatus of claim 9, wherein the load balancing policy specifies that the plurality of IO target components serves a substantially equal IO load.

15. A non-transitory processor-readable storage medium having stored therein program code of one or more software programs, wherein the program code when executed by at least one processing device causes the at least one processing device to perform the following steps:
obtaining a number of target ports of a storage system needed in a host connectivity plan for a given host device;
identifying a plurality of available target ports in the storage system and an input-output (IO) target component, of a plurality of IO target components, associated with each available target port;
calculating the host connectivity plan by performing the following steps until the host connectivity plan includes the obtained number of target ports: (i) selecting at least one of the plurality of IO target components that is not already in the host connectivity plan that satisfies one or more of a resiliency policy and a load balancing policy; (ii) selecting at least one of one or more target ports associated with the selected at least one IO target component; and (iii) adding the selected at least one target port to the host connectivity plan; and
providing the host connectivity plan to the given host device.

16. The non-transitory processor-readable storage medium of claim 15, wherein the host connectivity plan comprises a list of the selected target ports for the given host device to connect with.

17. The non-transitory processor-readable storage medium of claim 15, wherein the resiliency policy specifies that the host connectivity plan must include at least two target ports that provide connectivity without a single point of failure.

18. The non-transitory processor-readable storage medium of claim 17, wherein the host connectivity plan allows the given host device to connect to the storage system using at least two different paths such that a failure of any one hardware component in the at least two different paths will not impact both of the at least two different paths.

19. The non-transitory processor-readable storage medium of claim 15, wherein the load balancing policy balances an IO load among the plurality of IO target components based at least in part on one or more of: a number of host connections, a number of storage volumes, an expected IO load and an average IO load.

20. The non-transitory processor-readable storage medium of claim 15, wherein the load balancing policy specifies that the plurality of IO target components serves a substantially equal IO load.

* * * * *